US009533274B2

United States Patent
Stevanovic et al.

(10) Patent No.: US 9,533,274 B2
(45) Date of Patent: Jan. 3, 2017

(54) APPARATUS AND METHOD FOR CRACKING GASES

(71) Applicant: KRONES AG, Neutraubling (DE)

(72) Inventors: Dragan Stevanovic, Sulzbach-Rosenberg (DE); Thomas Oehmichen, Regensburg (DE)

(73) Assignee: Krones AG (DE)

( * ) Notice: Subject to any disclaimer, the term of this patent is extended or adjusted under 35 U.S.C. 154(b) by 0 days.

(21) Appl. No.: 14/649,726

(22) PCT Filed: Dec. 6, 2013

(86) PCT No.: PCT/EP2013/075858
§ 371 (c)(1),
(2) Date: Jun. 4, 2015

(87) PCT Pub. No.: WO2014/087000
PCT Pub. Date: Jun. 12, 2014

(65) Prior Publication Data
US 2016/0059197 A1  Mar. 3, 2016

(30) Foreign Application Priority Data
Dec. 6, 2012 (DE) .......... 10 2012 111 900

(51) Int. Cl.
*B01J 8/04* (2006.01)
*C01B 3/02* (2006.01)
(Continued)

(52) U.S. Cl.
CPC .......... *B01J 8/0496* (2013.01); *B01J 8/02* (2013.01); *B01J 8/04* (2013.01); *C01B 3/02* (2013.01);
(Continued)

(58) Field of Classification Search
CPC .......... C01B 2203/142; C01B 2203/0435; C01B 2203/0465; C01B 2203/0255; C01B 3/36; B01J 8/02
See application file for complete search history.

(56) References Cited

U.S. PATENT DOCUMENTS 2,885,455 A    5/1959  Hennig
6,299,994 B1 * 10/2001 Towler et al. ......... B01J 8/0453
                                                423/652
(Continued)

FOREIGN PATENT DOCUMENTS

CN   101346176    1/2009
CN   101462694    6/2009
(Continued)

OTHER PUBLICATIONS

International Search Report dated Dec. 6, 2013, issued in corresponding International Application No. PCT/EP2013/075858.
(Continued)

*Primary Examiner* — Stanley Silverman
*Assistant Examiner* — Syed Iqbal
(74) *Attorney, Agent, or Firm* — Onello & Mello, LLP

(57) ABSTRACT

An apparatus for cracking gases with a supply line (1) for a carbon-containing gas, by means of which the gas is capable of being supplied to a first heat exchanger (5, 9) with a fill of a thermal storage mass, a first combustion chamber (6, 8) which is arranged downstream in the direction of flow of the gas and which, in particular, has a supply device capable of being regulated for another oxygen-containing gas, by means of which a partial oxidation of the carbon-containing gas is carried out by the hypostoichiometric supply of oxygen, and a reactor (7) which is arranged downstream of the first combustion chamber (6, 8) in the direction of flow of the gas which has a fill of a catalytically acting material for the catalytic splitting of impurities of the carbon-con-
(Continued)

taining gas. According to the invention a second combustion chamber (6, 8) with a supply device—in particular capable of being regulated—for an oxygen-containing gas, by means of which a partial oxidation of the catalytically prepared carbon-containing gas is carried out by the hypostoichiometric supply of oxygen, is arranged downstream of the reactor (7) in the direction of flow of the carbon-containing gas, and a second heat exchanger (5, 9) with a fill of a thermal storage mass is arranged downstream of this combustion chamber in the direction of flow of the gas, wherein the direction of flow of the carbon-containing gas is capable of being reversed at least in a region which encloses the first and second heat exchanger (5, 9), the first and second combustion chamber (6, 8) and the reactor (7).

13 Claims, 2 Drawing Sheets

(51) Int. Cl.
*B01J 8/02* (2006.01)
*C01B 3/36* (2006.01)
(52) U.S. Cl.
CPC ........ *C01B 3/36* (2013.01); *B01J 2208/00168* (2013.01); *B01J 2208/027* (2013.01); *C01B 2203/0255* (2013.01); *C01B 2203/0435* (2013.01); *C01B 2203/0465* (2013.01); *C01B 2203/142* (2013.01)

(56) References Cited

U.S. PATENT DOCUMENTS

2007/0144940 A1 6/2007 Hershkowitz et al.
2012/0259147 A1 10/2012 Payne

FOREIGN PATENT DOCUMENTS

| CN | 101955804 | 1/2011 | |
|---|---|---|---|
| EP | 1182248 | 2/2002 | |
| WO | 02051965 | 7/2002 | |
| WO | WO 02051965 A1 * | 7/2002 | ............... C10G 9/26 |

OTHER PUBLICATIONS

German Search Report dated Dec. 6, 2012, issued in corresponding German Application No. 10 2012 111 900.7.
Chinese Office Action dated Jul. 4, 2016, issued in corresponding Chinese Application No. 201380064136.2, with English language summary.

* cited by examiner

APPARATUS AND METHOD FOR CRACKING GASES

The present invention relates to an apparatus and a method for cracking gases, in particular gases from gasification processes of carbon-containing starting materials. In particular, an apparatus for cracking gases with a supply line for a carbon-containing gas is provided, by means of which the gas of a first fill is capable of being conveyed to a thermal storage mass, a first combustion chamber which is arranged downstream in the direction of flow of the gas and which has a supply device capable of being regulated for another oxygen-containing gas by means of which a partial oxidation of the carbon-containing gas is carried out by the hypostoichiometric supply of oxygen, and a reactor which is arranged downstream of the first combustion chamber in the direction of flow of the gas which has a fill of a catalytically acting material for the catalytic splitting of impurities of the carbon-containing gas.

Gases, in particular gases of gasification processes of carbon-containing starting materials, can be contaminated with substances which possibly do not rule out an energetic use of the gas depending on the nature of the contamination, but nevertheless prevent a further material use of these gases for the production of methanol, diesel or petrol for example. Even in the case of an energetic use of these gases, however, the removal of these impurities may be necessary in order to prevent for example damages and/or deposits in a turbine or piston engine. Depending on the nature of the use it may consequently be necessary to remove these impurities from the gases. In particular, in the case of material use, very high demands are set upon the gas quality, since otherwise the life of the catalysts used for the chemical conversion is considerably reduced.

In particular, in the case of gases which are produced by a gasification process of carbon-containing starting materials such as biomass, coal or plastic waste, impurities such as for example $NH_3$, HCN, $H_2S$, COS, halogens, alkalis, tars and others as well as dusts may be present, and in particular the aforesaid tars are significant during the removal in this case.

A gasification process is to be understood, in particular, as being the thermo-chemical gasification of carbon-containing starting materials such as for example biomass, coal or plastic waste.

Tars are to be understood in the following as being complex multiple-substance mixtures of organic components, in particular cyclic and polycyclic aromatic hydrocarbons.

The charging of a gas contained in a gasification process with tars can also be dependent for example, as well as the carbon-containing starting material, upon the gasification conditions and the type of gasifier. The tar content in the gas flow can be for example between 1 and 100 $g/m^3$. Measures for the reduction of tar in gases are already known from the prior art. They can be divided in principle into primary and secondary measures. Primary measures are understood to be techniques which are already applied during the gasification process. Secondary measures are arranged downstream with respect to the gasifier. The latter may be subdivided into two main categories: physical methods and cracking/reforming.

The physical gas-cleaning measures include electrostatic precipitators, cyclones, filters and water- and oil-based washing means. These methods have the drawback that a subsequent energetic and material further utilization is not readily possible.

In the case of cracking/reforming, a distinction is made between thermal cracking and catalytic cracking/reforming. In the case of exclusively thermal cracking, cracking without the presence of a catalytically active substance, temperatures of at least 1000° C. are necessary. For the complete conversion of naphthalene for example, temperatures of above 1400° C. are even necessary. The high energy requirement associated with this frequently involves a loss of calorific value. Furthermore, the formation of undesired by-products in the form of solid carbon deposits can be significantly increased during the thermal cracking.

In the case of catalytic tar removal the tar is reacted on a catalytically active substance at temperatures of for example from 800 to 900° C. The catalysts used can be for example in the form of natural minerals such as dolomite or olivines or synthetic catalysts such as Ni steam reforming catalysts. On account of deactivation by sulphur and/or excessive charges of tar, however, the latter still do not possess an adequate life.

Various attempts are therefore known from the prior art to develop special tar-reforming catalysts with longer lives. One example has been proposed in the publication WO 2009/132959.

A drawback with all the cracking/reforming methods is the expenditure of energy for achieving the high reaction temperatures.

In order to be able to achieve these high temperatures, a method of thermal exhaust gas purification for example of dioxins or furans by combustion (i.e. by means of oxygen excess) has been proposed for example in the patent specification DE 10 2004 026 646. A portion of the raw material introduced is thus used as a fuel and is no longer available for further energetic or material use.

The patent specification DE 195 21 673 describes a method of regenerative cleaning of exhaust air, in which two large storage masses and one small storage mass are used in order to heat the exhaust air, before the pollutants are burned, and to cool it again after the combustion, in order to utilize the waste heat for heating purposes in a next step. As a result, a higher degree of energy efficiency should likewise be achieved.

In addition, it is possible for tar-charged product gases to be conveyed over a cold, radial fill, so that the tars are condensed out. Air or oxygen is conveyed over this fill in a second step, as a result of which the tars are oxidized. The fact that only gases with low tar charges can be cleaned and that the tars are only used energetically has been found to be a drawback.

A method for cracking in a fixed bed reactor with a flow reversal is described in the specification WO 02/051965. In this case a gas to be cracked is conveyed over a fill into a combustion chamber in which the temperature is maintained by the addition of oxygen. The gas is then conveyed away out of the combustion chamber over a second fill. On account of the heat stored in the fixed bed and the periodic flow reversal a high degree of heat recovery is possible. In order to achieve a virtually continuous operation, a third fill is additionally used for rinsing purposes.

A drawback of the method proposed in the specification WO 02/051965 has been found to be the inadequate selectivity at low temperatures with respect to the desired cracking products, which is revealed in a significantly higher tendency to form solid carbon deposits. This is significant in particular during the heating of the gas. The coking rate depends in this case upon a plurality of parameters such as fill material, tar composition and concentration, gas composition, temperature and residence time. The formation of coke leads in this case to an increase in the loss of pressure over the fill in the long term. In addition, dusts contained in the gas can settle on the fill, so that an additional loss in pressure can occur in this case. Furthermore, the use of catalytic materials as storage material is limited, since they must frequently be used in a defined temperature window. Consequently, on account of the temperature gradient in the fill only small volumes and short residence times are possible.

The object of the present invention is to provide an apparatus and a method for the utilization of hydrocarbons, which permit a high degree of efficiency and a high degree of effectiveness. In addition, an object is further to minimize the expenditure of energy and the heat losses for cracking or reforming methods, as well as to improve the gas quality for following processes. A further object is to minimize the undesired formation of tar by-products, as well as to provide the possibility of placing a catalytically effective substance in an adequate volume at an optimum reaction temperature inside an apparatus for cracking gases.

Furthermore, a method should be provided which supplies necessary heat by a regenerative method extensively renewed to the process, as well as an apparatus which makes it possible to carry out a method of this type.

These objects are attained by an apparatus for cracking gases with a supply line for a carbon-containing gas, by means of which the gas is capable of being supplied to a first heat exchanger with a fill of a thermal storage mass, a first combustion chamber which is arranged downstream in the direction of flow of the gas which has a supply device—in particular capable of being controlled and preferably regulated—for another oxygen-containing gas, by means of which a partial oxidation of the carbon-containing gas is carried out by the hypostoichiometric supply of oxygen, and a reactor which is arranged downstream of the first combustion chamber in the direction of flow of the gas and which has a fill of a catalytically acting material for the catalytic splitting of impurities of the carbon-containing gas, characterized in that a second combustion chamber with a supply device—in particular capable of being controlled and preferably in particular regulated—for an oxygen-containing gas, by means of which a partial oxidation of the catalytically prepared carbon-containing gas is carried out by the hypostoichiometric supply of oxygen, is arranged downstream of the reactor in the direction of flow of the carbon-containing gas, and a second heat exchanger with a fill of a thermal storage mass is arranged downstream of this combustion chamber in the direction of flow of the gas, wherein the direction of flow of the carbon-containing gas is capable of being reversed at least in a region which encloses the first and second heat exchanger, the first and second combustion chamber and the reactor. It is advantageous for the apparatus to have at least one valve, and in a particularly advantageous manner a plurality of valves, in order to reverse the aforesaid flow apparatus.

On account of this apparatus it becomes possible for the tar-charged gas to be supplied, over a fill in which first cracking reactions can already take place, to a combustion chamber in which the temperature setting is carried out by—preferably—permanent hypostoichiometric injection of oxygen-containing gases. An at least partial thermal cracking of the tars contained in the gas is already possible in this combustion chamber before the entry of the gas into the reactor, in which a catalytic splitting of impurities present in the gas is provided. Tars and further impurities remaining in the thermally treated and partially oxidized gas are split catalytically by the fill—present in the reactor—of the material acting catalytically. After that, the gas can be supplied to a further combustion chamber in which the temperature is again brought into a pre-set range by hypostoichiometric injection of oxygen or is kept in this range respectively. The gas is conveyed away—at least indirectly—from this second combustion chamber into a second heat exchanger.

It would be possible to dispense with the reactor and, instead of it, to provide only one combustion chamber. The reactor preferably provides the possibility, however, of supplying additional substances, and in particular catalytically acting substances (such as for example dolomite or nickel-containing substances or materials respectively). It is therefore advantageous for the reactor to have a supply device for the supply of additional substances. The Applicants retain the right also to claim protection for such a design without a reactor.

The first fill or the first heat exchanger respectively preferably acts as a heat donor by which the temperature of the gas is already increased before flowing into the first combustion chamber. The second fill or the second heat exchanger respectively preferably serves as a heat acceptor and is heated by the energy contained in the cleaned (and partially oxidized) gas. As a result of the supply of the cold crude gas to the first heat exchanger, the latter continuously cools, whereas the second heat exchanger is continuously heated by the supply of the hot clean gas. If the fill in the first heat exchanger is cooled below a minimum temperature and/or if the fill in the second heat exchanger is heated to the degree that the gas flowing through is not cooled sufficiently, the flow pattern at least in the two fills and in the region situated between them can be reversed by a suitable valve control, as a result of which a regenerative method is provided and thermal energy stored in the second fill is supplied extensively renewed to the process.

The fill volumes of the two fills are designed in this case in such a way that the gas is heated at a heating rate of at least 2000 K/s, preferably 3000 K/s and in a particularly advantageous manner more than 4000 K/s. In this way, the residence time in the critical temperature window in which the coking reactions take place is minimized. This ensures that the coking rate is significantly reduced.

The apparatus is suitable for carrying out a regenerative cracking method. To this end, a flow reversal has to take place in certain time steps. This is preferably carried out by suitable valves in the gas lines. The respectively doubled design of the fills and the combustion chambers allows the gas to be able to flow—independently of the direction of flow—first through a fill and then through a combustion chamber, before it arrives in the reactor. The gas is preheated in the fill and is brought to the desired temperature in the combustion chamber by partial oxidation and impurities such as for example tars are already removed at least in part in this case. In the same way the gas—likewise independently of the direction of flow—can be brought to a desired temperature—again by partial oxidation—in a further combustion chamber after leaving the reactor and the (endothermic) cracking reaction carried out in the latter. Finally, the thermal energy present in the gas can be used for heating the heat storage medium in the second heat exchanger. By means of the two combustion chambers and by means of the reaction heat released therein on account of the partial oxidation in each case the thermal energy can thus be produced for the cracking reactions on the one hand and the heat losses of the plant can be compensated on the other hand.

In a preferred embodiment at least one fill, but preferably both fills, is or are traversed radially by the gas at least in part. In this case it is preferable for the fill material to be surrounded by a cylindrical cold grill and a likewise cylindrical hot grill. Conventional bulk material regenerators, as known from the prior art, can be used to this end. Bulk material regenerators of this type are thus particularly suitable, since high temperature gradients in the fill and, as a result, high rates of heating of at least 2000 K/s can be carried out in this way.

As the cold tar-containing gas flows through the heat store, part of the dust contained in the gas is held back by the storage mass. In order to counteract the increasing loss of pressure resulting therefrom, suitable steps must be taken. It is therefore preferable for at least a part of the storage mass of a fill of at least one heat exchanger to be capable of being removed from the apparatus and to be capable of being returned thereto—preferably in a discontinuous manner and in a particularly preferred manner pneumatically—for cleaning the aforesaid heat exchanger. In this case it is preferable for the bulk material to be extracted from the base of the bulk material reactor, to be conveyed upwards preferably pneumatically and to be returned to the regenerator after a cleaning. The dust adhering to the bulk material can be separated for example by means of a cyclone.

It is preferable for the storage mass (after the removal and cleaning described above) to be capable of being returned to a hot zone of a fill. Since the storage mass is preferably removed from a cool zone of a fill, a continuous exchange and thus a continuous cleaning of the storage mass is possible in this way. In this case it is advantageous for a conveying device to be provided for conveying the storage mass. It is advantageous for a removal opening for the removal of the storage mass from at least one heat exchanger to be provided as well as preferably also a supply opening in order to supply the storage mass to the apparatus, and in particular to a heat exchanger and/or to the reactor.

In an advantageous embodiment of the recirculation of the bulk material air, thinned air or gases otherwise containing oxygen are used as the carrier flow. The oxygen can then react with the possibly adhering coke and/or other dusts or impurities respectively to form $CO_2$. This ensures that residues of coke are burnt off during the conveying phase. In a further advantageous embodiment of the recirculation of the bulk material an additional container, in which the bulk material is first collected and in which the burning out is preferably carried out in a discontinuous manner, can be interposed in order burn off the fill.

Since the heat in the proposed method or in the corresponding apparatus respectively is recovered in a regenerative manner, it can happen that, when the direction of flow is switched over, gas which has not yet been cleaned arrives in the lines of the gas which has already been conditioned. According to a particularly advantageous embodiment, therefore, the apparatus has a third fill of a thermal storage mass. On account of this third heat storage fill it is possible to rinse the first and second fill. This can be carried out for example by the flow being reversed on the line portion previously following the reactor in the direction of flow of the gas (the gas thus now flows through this line in the direction of the reactor), but after the cracking the gas leaves the reactor through the third fill and thus cannot convey any dust or other impurities out of the fill, which has been used previously for heating the gas before being supplied to the reactor, into the removal line or product gas line respectively or clean gas line The storage mass of the third fill is preferably designed in this case in such a way that the loss of pressure over this fill is just as great as the pressure drop over the first or second fill. If the volume of the third fill is not equal to the first and second fill, an equalization of the loss of pressure can be carried out for example by adjusting the particle size of the third fill and/or by varying the particle geometry of the third fill.

A further preferred embodiment is characterized in that the third fill is built up axially and that it is connected to the reactor. The reactor and the third fill can be arranged, in particular, in the same housing. In this case it is preferable for the reactor with the reaction fill to be arranged above the third fill. It may be advantageous in this case for a further layer to be arranged for insulation purposes between the third fill (the third bed) and the reactor or the reaction bed respectively. A material with a low thermal conductivity is preferred for this. It is advantageous for this insulation layer to be formed from honeycomb stones.

In a preferred embodiment the third fill is bonded in a pipeline system of the apparatus in such a way that it is capable of having only a flushing gas and/or gas from the reactor flow through it independently of the direction of flow of the gas through the first and second fill and/or the first and second heat exchanger. Switching over between the fills is preferably carried out in this case in such a way that the third fill is always acted upon only with hot or cold pure and/or flushing gas. As a result, the adhesion of dust is prevented in this fill and/or the occurrence of coke is suppressed as far as possible. As a result, the apparatus and the method can be simplified and operated more inexpensively, since devices for continuous conveying (for the removal of dust) can be omitted in this (third) fill.

For the regenerative heat exchangers (the fills) honeycomb bodies or spherical fills (also called pebbles) in the fixed bed are used as heat stores. As an alternative to the spheres, any types of shapes can be used, such as for example saddle members or Raschig rings. The diameter of the spheres is freely selectable, wherein the specific surface increasing per volume by smaller spheres, which exerts a positive influence upon the heat transmission. The pebbles, honeycomb bodies or the like can be produced for example from inert alumina ($Al_2O_3$). It may be advantageous to mix the alumina pebbles with catalytically active substances, such as for example cobalt, nickel, chromium or the oxides or sulphides thereof.

As an alternative to alumina, it is also possible for example for limestone or dolomite to be used as the heat storage medium, whose catalytic properties are known. In addition, olivine is a suitable storage material since, in contrast to dolomite or limestone, it has an adequate mechanical stability or abrasion resistance respectively, so that it can be used for continuous conveying.

All the catalytic materials named above and/or mixtures of them and/or mixtures of them with an inert material can be used as a material for the reaction fill. In this way for example, Ni catalysts are inclined to heavy coking with high tar charges >2 g/Nm$^3$, so that it may be advantageous for a layer of dolomite and/or olivine to be placed before and after this layer.

In a preferred embodiment the apparatus has a flushing gas supply line, by means of which a flushing gas is capable of being supplied to at least one fill or one heat exchanger respectively, preferably to all the fills or heat exchangers respectively. The flushing gas used can be for example in the form of cracked gas, inert gas or water vapour. Cracked gas can be fed back to the system again by way of a blower for example. Water vapour is particularly preferred.

The object set is further attained by a method for cracking gases, in which a carbon-containing gas is first fed by a supply line to a first heat exchanger with a fill of a thermal storage mass, is then supplied to a first combustion chamber in which a partial oxidation of the carbon-containing gas is carried out by the hypostoichiometric supply of oxygen for another oxygen-containing gas (which is carried out, in particular, by a supply device capable of being controlled and preferably regulated), and after that the carbon-containing gas is introduced into a reactor which preferably has a fill of a catalytically active material for the catalytic splitting of impurities of the carbon-containing gas, in which case after being treated in the reactor the carbon-containing gas is supplied to a second combustion chamber in which a partial oxidation of the carbon-containing gas is carried out by the hypostoichiometric supply of oxygen (which is carried out, in particular, by a supply device capable of being controlled and preferably regulated), and arriving from this combustion chamber is conveyed through a second heat exchanger (which preferably has a fill of a thermal storage mass), wherein the direction of flow of the carbon-containing gas is reversed after a certain interval of time at least in a region which encloses the first and second heat exchanger, the first and second combustion chamber and the reactor. It is preferable for the reversal to take place by means of valves.

In a preferred variant of the method it is provided that during a reversal of flow a third storage mass is temporarily added, preferably in such a way that the third storage mass has the gas flowing through it.

In a further preferred variant of the method, while the carbon-containing gas is conveyed through at least one of the heat exchangers with fills of a storage mass, the carbon-containing gas passed through is heated at a heating rate of at least 2000 K/s, preferably of at least 3000 K/s and in a particularly preferred manner of at least 4000 K/s.

The extensive decoupling of the heating zone and the reaction zone is particularly advantageous in this method. As a result, the catalytically active substances can be contained in an adequate quantity for ensuring high residence times in a temperature zone in which they are particularly active. In addition, as a result of a purposeful selection of the material of the storage mass, the coking rate can be reduced still further during the heating. Furthermore, the storage mass can be designed in a purposeful manner in accordance with heating requirements, without reaction-kinetic parameters having to be taken into consideration in this case.

A method for cracking gases is furthermore preferred in which the gas flow is supplied to a high-temperature space which comprises two combustion chambers in which the temperature is maintained by the hypostoichiometric addition of oxygen and between which is arranged a reaction fill on which the cracking reactions essentially take place and in which it is advantageous for the gas to be heated in a regenerative manner by means of two storage masses and to be cooled again, wherein the heating of the entry temperature to high temperature being carried out at a heating rate of at least 2000 K/s.

In the case of this method, for the purpose of dust separation it is preferable for part of the storage mass to be drawn off in a discontinuous manner and to be returned again cleaned. It is further preferred, for the purpose of the dust separation, for the extraction of the part of the storage mass to be carried pneumatically. It is still further preferred for deposits of carbon adhering to the fill material to be burnt off.

It is preferable for the apparatus to be characterized in that the third storage mass is contained in the same vessel in which the reaction fill is also contained. It is further preferred for the third storage mass to be acted upon only with hot cracked gas and flushing gas. It is preferable for cracked gas or water vapour to be used as flushing gas in the apparatus.

Further advantages, aims and properties of the present invention are explained with reference to the following description of the accompanying drawing, in which an apparatus for cracking gases is illustrated by way of example. Components of the apparatus for cracking gases, which correspond at least substantially with respect to their function in the figures, can be designated with the same reference numerals in this case, wherein it is not necessary for these components to be numbered and explained in all the figures.

IN THE DRAWINGS

Figure 1:
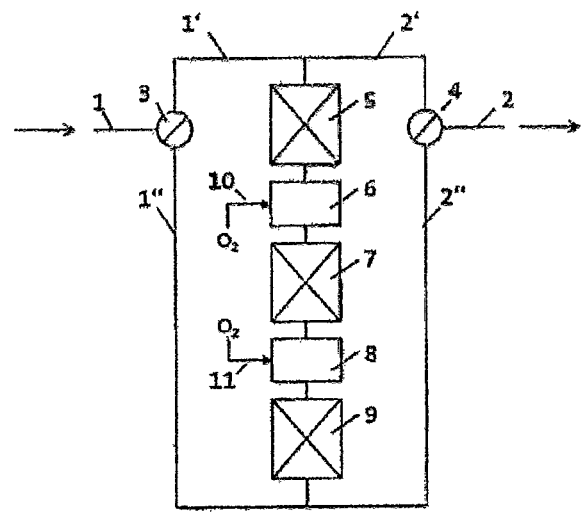
FIG. 1 shows in a diagrammatic manner the design of an apparatus for cracking gases.

FIG. 1 shows a diagrammatic structure of an apparatus for cracking gases. FIG. 1 is likewise a flow sheet of the method. Gas is supplied to the reactor by way of a valve 3 from a main supply line 1 either by way of the supply line 1' and removed by way of an exhaust gas line 2" or, after a flow reversal, is supplied by way of a supply line 1" and removed by way of the exhaust gas line 2'. The cleaned gas can be supplied for further use (not shown) by way of a valve 4 and a main removal line 2. The position of the valves 3 and 4 is changed, preferably periodically.

The gas to be cleaned flows through a heat exchanger 5 with a fill, in which it is heated at a heating rate of at least 2000 K/s, into a combustion chamber 6, after which it is supplied to a reaction fill 7 in which the tars contained in the gas are reacted. After that, the gas flows through a further combustion chamber 8 as well as a heat exchanger 9 with a fill from the reactor. The fill 5 serves in this case as a heat donor, and the fill 9 as a heat acceptor. When the flow is reversed the fill 9 acts accordingly as a heat donor, whilst the fill 5 as a heat acceptor.

Hypostoichiometric oxygen-containing gas is injected into the combustion chambers 6 and 8 by way of the lines 10 and 11. This can be for example air or, in a particularly advantageous manner, pure oxygen. As a result, a partial oxidation takes place, by which the heat losses of the plant and the heat requirement of the crack reactions are covered.

In order to be able to achieve the heating rates, as high as possible, of at least 2000 K/s, the fills 5 and 9 have the gas flow through them preferably radially.

For cleaning purposes, part of a fill can be drawn off discontinuously, can be freed of adhering dust and can then be conveyed back (not shown) into the fill. It is preferable for the conveying of the fill to be carried out pneumatically, so that the dust is removed solely by the mechanical movement of the fill material. In a preferred variant of the embodiment named above, possibly adhering coke is burnt off by means of oxygen-containing gases (for example air or thinned air).

The return of the part of the fill separated out (likewise not shown) is preferably carried out in such a way that the fill material is introduced specially into the hot zone of the fill, as close as possible to the combustion chamber, so that coke still adhering is removed in situ on the basis of the reaction conditions prevailing there.

Figure 2:
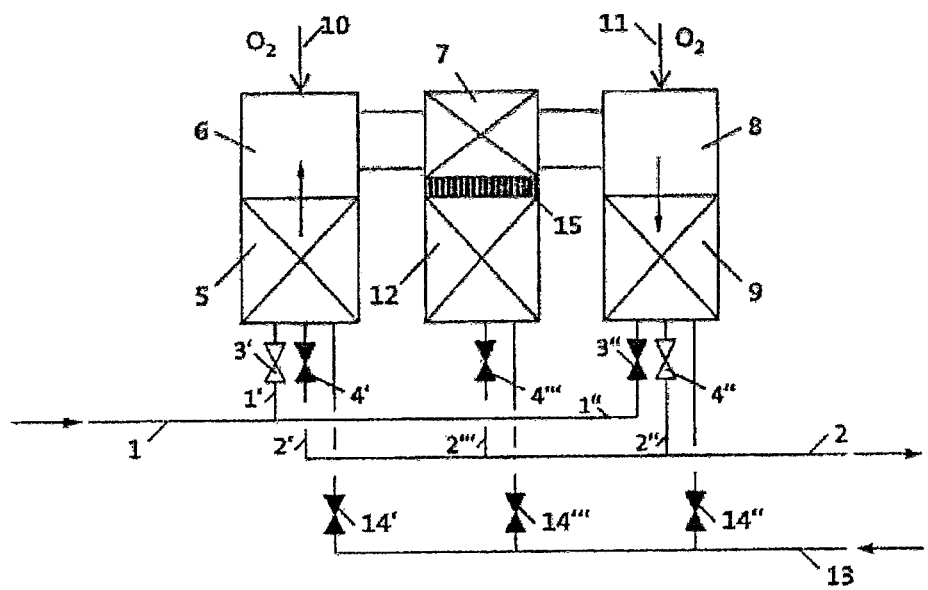
FIG. 2 shows a preferred embodiment of the apparatus with an additional third fill.

FIG. 2 shows a preferred embodiment of the apparatus with an additional third fill 12.

In order to ensure a continuous manner of operation and to prevent impurities of the pure gas line 2, a flushing phase before the flow reversal is necessary. This is achieved by a third fill 12 being used for a short time.

In FIG. 2 the open valves 3' and 4" are shown white and the closed valves 3", 4' and 4''' as well as 14', 14" and 14''' are shown black. In the circuit illustrated the gas flow supplied by way of the main supply line 1 flows over the fill 5, is heated during this and thus arrives in the combustion chamber 6. In the latter the temperature is regulated by the addition of oxygen and/or oxygen-containing gases. The gas is then conveyed over a reaction fill 7, on which the tars are reacted catalytically. The gas flow is conveyed into a combustion chamber 8 in which the temperature is brought to the level in the combustion chamber 6 by the renewed addition of oxygen. In particular, as a result of this, the heat losses are covered on account of the endothermic cracking/reforming reactions. The gas flow is cooled by way of the fill 9 and is available for further processing steps.

In order to change the direction of flow it is necessary to switch to a third fill 12 for the purpose of the flushing. This can be carried out in a separate vessel, but it is particularly advantageous for the third fill 12 to be arranged in the same vessel in which the reaction fill 7 is arranged. In this case the third fill 12 is also used for fixing the reaction fill 7. It is particularly advantageous for a layer 15 consisting of honeycomb stones for example to be arranged between the third fill 12 and the reaction fill 7 for insulation purposes. As a result of this, the loss of high-temperature heat from the reaction layer is minimized as much as possible by conductive and convective heat flows.

Figure 3:
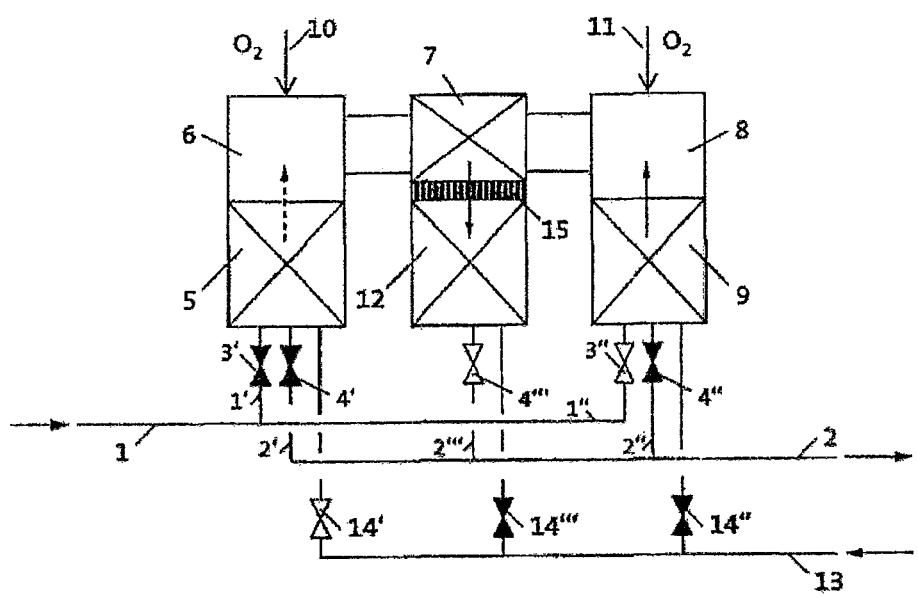
FIG. 3 shows a special circuit shape of the embodiment shown in FIG. 2.

A special circuit shape of the embodiment shown in FIG. 2 is illustrated in FIG. 3. In this case the fill 5 is acted upon with flushing gas by way of the flushing line 13.

As already mentioned above, during the flow reversal, impurities from the heat exchangers 5, 9 should be prevented from being able to pass into the pure gas flow 2. A possibility of preventing this is possible by the valve circuit shown in FIG. 3. In the case of the circuit shown the product gas does not flow through one of the first or second heat exchangers 5, 9 into the removal line 2 but through the third fill 12. At no time is the latter subjected to the crude gas flow, so that a contamination of the third fill 12 with dust or similar deposits is prevented.

In order to prevent the fill 12 from being heated in the flushing times and thus reducing the efficiency of the plant, the valve 14''' should be opened for a certain period of time for reasons of heat equalization. This is always possible when the fill 12 has not got hot gas flowing through it.

At the same time as the diversion of the product gas through the third fill 12 and the opened valve 14''' into the clean-gas removal line 2 the first heat exchanger 5 can be cleaned with flushing gas by the valve 14' being opened. In addition, the mechanical cleaning (not shown) of the fill as described above can also be carried out.

After the cleaning of the fill of the first heat exchanger 5 the valve 4''' can be closed and the valve 3' can be opened, in order to achieve a flow of the gas in a direction opposed to the direction of flow shown in FIG. 2 in the region of the heat exchangers 5, 9 of the combustion chambers 6, 8 and the reactor 7.

The Applicants reserve the right to claim all the features disclosed in the application documents as being essential to the invention, insofar as they are novel either individually or in combination as compared with the prior art.

LIST OF REFERENCES

1, 1', 1" main supply line, crude gas line
2, 2', 2", 2''' main removal line, crude gas line
3, 3', 3" crude gas valves
4, 4', 4", 4''' clean gas valve
5 first heat exchanger, storage mass, fill
6 first combustion chamber
7 reaction fill
8 second combustion chamber
9 second heat exchanger, storage mass, fill
10 oxygen injection
11 oxygen injection
12 third storage mass, third fill
13 flushing line
14', 14", 14''' flushing valve
15 insulation layer, for example honeycomb stones

The invention claimed is:

1. An apparatus for cracking gases with a supply line for a carbon-containing gas, by means of which the gas is capable of being supplied to a first heat exchanger with a fill of a thermal storage mass, a first combustion chamber which is arranged downstream in the direction of flow of the gas and which, in particular, has a supply device capable of being regulated for another oxygen-containing gas, by means of which a partial oxidation of the carbon-containing gas is carried out by the hypostoichiometric supply of oxygen, and a reactor which is arranged downstream of the first combustion chamber in the direction of flow of the gas which has a fill of a catalytically acting material for the catalytic splitting of impurities of the carbon-containing gas, wherein a second combustion chamber with a supply device—in particular capable of being regulated—for an oxygen-containing gas, by means of which a partial oxidation of the catalytically prepared carbon-containing gas is carried out by the hypostoichiometric supply of oxygen, is arranged downstream of the reactor in the direction of flow of the carbon-containing gas, and a second heat exchanger with a fill of a thermal storage mass is arranged downstream of this combustion chamber in the direction of flow of the gas, wherein the direction of flow of the carbon-containing gas is capable of being reversed at least in a region which encloses the first and second heat exchanger, the first and second combustion chamber and the reactor, and wherein the apparatus comprises at least one valve in order to reverse the flow of the gas.

2. An apparatus according to claim 1, wherein the volume and/or the specific surface of at least one of the heat exchangers, fills and/or storage mass, preferably the volumes and/or the specific surface of both heat exchangers, fills and/or storage masses are designed in such a way that the carbon-containing gas capable of being conveyed through is capable of being heated at a heating rate of at least 2000 K/s, preferably of at least 3000 K/s and in a particularly advantageous manner of at least 4000 K/s.

3. An apparatus according to claim 1, wherein the heat exchangers, fills and/or storage masses are capable of being traversed radially by the carbon-containing gas.

4. An apparatus according to claim 1, wherein at least a part of a storage mass of at least one fill and/or one heat exchanger is capable of being removed from the heat exchanger and of being returned thereto—preferably in a discontinuous manner and in a particularly preferred manner pneumatically—for cleaning the aforesaid heat exchanger.

5. An apparatus according to claim 4, wherein the storage mass is capable of being returned to a hot zone of a fill.

6. An apparatus according to claim 1, wherein it has a third fill of a thermal storage mass.

7. An apparatus according to claim 6, wherein the third fill is bonded in a pipeline system of the apparatus in such a way that it is capable of having only a flushing gas and/or gas from the reactor flow through it independently of the direction of flow of the gas through the first and second fill and/or the first and second heat exchanger.

8. An apparatus according to claim 6, wherein it has a flushing gas supply line, by means of which a flushing gas is capable of being supplied to at least one fill and/or one heat exchanger, preferably to all the fills and/or heat exchangers.

9. An apparatus according to claim 7, wherein the flushing gas is inert gas, water vapour and/or gas treated in the reactor.

10. A method for cracking gases, in which a carbon-containing gas is first fed by a supply line to a first heat exchanger with a fill of a thermal storage mass, is then supplied to a first combustion chamber in which a partial oxidation of the carbon-containing gas is carried out by the hypostoichiometric supply of oxygen, and after that the carbon-containing gas is introduced into a reactor, wherein
    after being treated in the reactor the carbon-containing gas is supplied to a second combustion chamber in which a partial oxidation of the carbon-containing gas is carried out by the hypostoichiometric supply of oxygen for another oxygen-containing gas, and coming from this combustion chamber the gas is conveyed through a second heat exchanger with a fill of a thermal storage mass, wherein the direction of flow of the carbon-containing gas is reversed after a certain interval of time at least in a region which encloses the first and second heat exchanger, the first and second combustion chamber and the reactor.

11. A method according to claim 10, wherein during a reversal of flow a third storage mass is temporarily added.

12. A method according to claim 10, wherein, while the carbon-containing gas is conveyed through at least one of the heat exchangers with fills of a storage mass, the carbon-containing gas passed through is heated at a heating rate of at least 2000 K/s, preferably of at least 3000 K/s and in a particularly preferred manner of at least 4000 K/s.

13. A method according to claim 10, wherein the reversal of the direction of flow is carried out by means of at least one valve and preferably by means of a plurality of valves.

* * * * *